United States Patent
Reilly, Jr. et al.

[11] Patent Number: 5,295,359
[45] Date of Patent: Mar. 22, 1994

[54] COMBINATION FLUID LEVEL INDICATOR AND DISCHARGE DEVICE

[75] Inventors: John H. Reilly, Jr., Rosemont, Pa.; Michel J. Maniez, Flemington, N.J.; Bryan M. Peckjian, Philadelphia, Pa.

[73] Assignee: National Refrigeration Products, Bensalem, Pa.

[21] Appl. No.: 948,369

[22] Filed: Sep. 21, 1992

[51] Int. Cl.$^5$ .............................. F25B 49/02
[52] U.S. Cl. ................................. 62/125; 62/469; 184/6.4; 184/108
[58] Field of Search ............... 62/125, 129, 193, 188, 62/299, 468, 469; 184/108, 6.4, 96, 97

[56] References Cited

U.S. PATENT DOCUMENTS

| | | | |
|---|---|---|---|
| 1,114,636 | 10/1914 | Nelson | 184/6.4 X |
| 1,163,919 | 12/1915 | Herb et al. | 184/108 X |
| 5,025,764 | 6/1991 | Kobayashi et al. | 184/6.4 X |

FOREIGN PATENT DOCUMENTS

| | | | |
|---|---|---|---|
| 2247130 | 5/1975 | France | 184/108 |
| 329860 | of 1903 | United Kingdom | 184/96 |

*Primary Examiner*—Harry B. Tanner
*Attorney, Agent, or Firm*—Panitch Schwarze Jacobs & Nadel

[57] ABSTRACT

A combination fluid level indicator and fluid discharge device is provided for preventing inaccurate fluid level indications and facilitating fluid discharge from a compressor or other container. The device includes a body or conduit having an inlet end installed in an aperture through to a compressor housing to fluidly communicate with the compressor and receive the lubricating oil therefrom. A visual indicator provides an indication of the level of the oil within the compressor housing. A discharge port with cap, plug, valve or other flow control member permits selective discharge of the fluid from the compressor through the body. The device is installed in an aperture extending through a side of a compressor housing proximate the bottom thereof and indicates the level of lubricating oil within the housing and permits discharge of oil from the housing.

20 Claims, 3 Drawing Sheets

COMBINATION FLUID LEVEL INDICATOR AND DISCHARGE DEVICE

FIELD OF THE INVENTION

The invention relates to indicating the level of a fluid within a container and permitting selective discharge of the fluid from the container and, more particularly, to a compressor including the aforementioned features to indicate the level of and selectively discharge a charge of lubricating oil.

BACKGROUND OF THE INVENTION

As awareness of the detrimental effect of fluorocarbons on the environment increases and government regulations on the release of fluorocarbons become more stringent, the use of refrigerant recovery systems is becoming more widespread. Refrigerant recovery systems are designed to draw refrigerant from disabled refrigeration systems. Typical refrigeration systems include household refrigerators, air conditioning units, heat pumps, vending machines for soft drinks, water coolers for drinking water, and other small air conditioning and refrigerating systems. Such systems typically use chlorofluorocarbons (CFC's), hydrochlorofluorocarbons (HCFC's) or other heat transfer medium. The use of CFC's as refrigerants is discussed in detail in U.S. Pat. No. 5,020,331, which is hereby incorporated by reference in its entirety.

When the compressor of such a refrigeration system is burned out, the motor winding of the compressor is melted and releases resins and acids into the refrigerant which are harmful to the refrigeration system. The contaminated refrigerant may be removed and recovered by use of a refrigerant recovery system and subsequently cleaned and recycled.

Many refrigerant recovery systems include a compressor for removing substantially vaporized refrigerant from a disabled refrigeration system and expelling the refrigerant from the compressor at an outlet pressure higher than the inlet pressure. Some of the contaminants contained within the refrigerant may be absorbed by the oil in the compressor of the recovery system. Therefore, it is often desirable if not necessary to change the oil in the compressor of the recovery system between different recovery operations. Contaminated compressor oil is typically drained through an oil outlet port and clean oil recharged through an oil inlet port. A small amount of compressor oil may dissipate during operation. In the event that the level of oil in the compressor is insufficient, additional oil may be added to the compressor through the oil inlet port. If the compressor is operated with insufficient lubricating oil for a sufficient period of time, it too will "burn out."

Various means are typically used to determine and/or monitor the level of lubricating oil in the compressor. For example, a sight glass has been mounted at the distal end of an elongated, L-shaped tube which was fluidly connected to the compressor housing However, compressor failure has occurred with the such indicators due to lack of lubrication even though the sight glass at the end of the L-shaped tube indicated that lubricant was present in the compressor because the L-shaped tube was not oriented properly with respect to the compressor housing. In particular, because of its extreme length, the distal end of the tube was often downwardly pitched. Even at a relatively small angle lubricant would collect at the distal end of the L-shaped tube and give an erroneous indication of an adequate level of lubricant in the compressor.

Many compressors are also provided with a separate drain outlet and plug in the bottom of the compressor housing for draining lubricant from the compressor. However, users typically encounter difficulties in completely draining lubricant from the compressor housing. When the unit is recharged, new refrigerant cycled through the compressor may then become contaminated. It would be advantageous to have a single device which may be coupled to a compressor or other container which provides a reliable indication of the oil level in the compressor and permits essentially complete draining of the compressor to inhibit cross-contamination between oil charges.

SUMMARY OF THE INVENTION

Briefly, one aspect of the present invention is a combination fluid level indicator and fluid discharge device for use with a container, such as a compressor, containing a fluid therein. The device comprises a tubular body having an open inlet end permitting communication with the fluid when the open end is fluidly coupled with the container. An indicator means provides an indication of a level of the fluid within the container when the open end is fluidly coupled with the container. The indicator means is preferably viewable from outside of the body. A discharge means is provided for permitting selective discharge of the fluid from the open inlet end through at least part of the tubular body.

A further aspect of the present invention is a combination fluid level indicator and fluid discharge device for use with a container containing a fluid therein. The device comprises a tubular body having an open inlet end. A visual indicator is configured and located to provide a visual indication from outside the body of a level of the fluid within the body. A discharge port is fluidly coupled with the open inlet end through at least part of the tubular body. An openable port closure member is movably coupled with the port to permit selective discharge of the fluid from the open inlet end through at least part of the body and through the port.

Another aspect of the present invention is a compressor for receiving a gas at a first pressure and expelling the gas at a second pressure higher than the first pressure The compressor comprises a housing having a top, a bottom and at least one side. The side includes an aperture extending therethrough located proximate the bottom. The housing is at least sufficiently sealed to contain a compressor lubricating fluid therein. The compressor also comprises a combination lubricating fluid level indicator and fluid discharge device. The device includes a tubular body fluidly communicating with the housing through the aperture. An indicator means indicates a level of the lubricating fluid within the fluidly coupled housing. A discharge means permits selective discharge of the lubricating fluid from the housing through at least part of the body.

Another aspect of the present invention is a compressor for receiving a gas at a first pressure and expelling the gas at a second pressure higher than the first pressure. The compressor comprises a housing having a top, a bottom, and at least one side. The side includes an aperture extending therethrough located proximate the bottom. The housing is at least sufficiently sealed to contain a compressor lubricating fluid therein. The compressor also comprises a combination lubricating fluid level indicator and fluid discharge device. The device includes a tubular body having an open inlet end in fluid communication with the housing through the aperture. The device also includes a visual indicator within the body. The visual indicator is responsive to a level of lubricating fluid within the housing. The indicator is visible from outside the body and the housing A fluid discharge port is fluidly coupled with the housing through at least part of the body to discharge the lubricating fluid from the housing through at least the part of the body and the port.

BRIEF DESCRIPTION OF THE DRAWINGS

The foregoing summary, as well as the following detailed description of the preferred embodiments, will be better understood when read in conjunction with the appended drawings. For the purpose of illustrating the invention, there are shown in the drawings embodiments which are presently preferred. It should be understood, however, that the invention is not limited to the specific methods and instrumentalities disclosed. In the drawings, which are diagrammatic.

DESCRIPTION OF THE PREFERRED EMBODIMENTS

Figure 1:
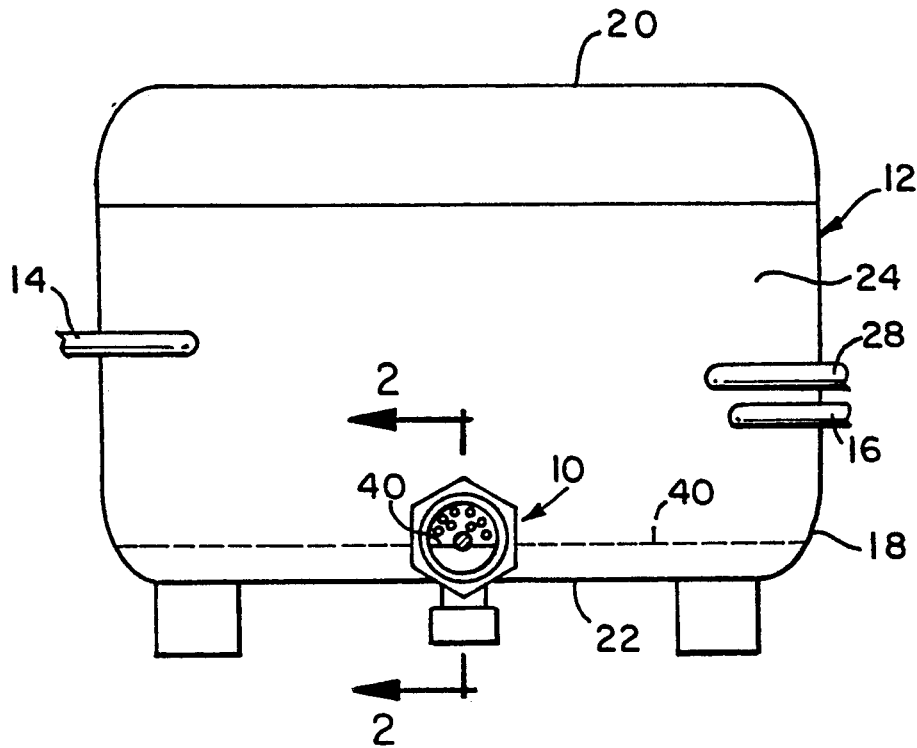
FIG. 1 is a front elevational view of a compressor and combination lubricating fluid level indicator and fluid discharge device, in accordance with the present invention.

Referring to the drawings, wherein like numerals indicate like elements throughout, there is shown in FIGS. 1-6 preferred embodiments of a combination fluid level indicator and fluid discharge device, generally designated 10, for use with a fluid container, or more specifically a compressor 12, in accordance with the present invention.

The compressor 12, best shown in FIG. 1, is used to recover refrigerant from a container (not shown). The container may typically be a small appliance, such as a household refrigerator, air conditioning unit or heat pump, an automotive air conditioner or any other air conditioning and/or refrigeration system well known to one of ordinary skill in the art. The present compressor 12 is not limited to use with the specific types of refrigerant containers discussed above, but may also be used to recover refrigerant from other refrigerant containers as is understood by the ordinary skilled artisan.

The present compressor 12 may typically be used to compress refrigerant received from refrigerant containers having approximately one ounce to approximately four pounds of refrigerant charged therein. However, it is understood by those skilled in the art that the present compressor 12 may be used to compress less than one ounce or greater than four pounds of refrigerant.

The compressor 12 is typically included as a component of a refrigerant recovery or transfer unit (not shown) which transfers refrigerant from such a container to a second container, such as a storage container (not shown). More specifically, the compressor 12 may be included as a component in a refrigerant transfer unit as is discussed in detail, for example, in U.S. patent application Ser. No. 07/775,633, U.S. Pat. No. 5,247,802 which is hereby incorporated by reference in its entirety. The specific internal configurations and elements of the refrigerant transfer unit are within the knowledge of those of ordinary skill in the refrigerant transfer unit art and, therefore, further description thereof is omitted for convenience only and is neither believed to be necessary nor limiting.

One of ordinary skill in the art would understand that the compressor need not be a component of a refrigerant transfer unit, but may be any compressor in keeping with the spirit and scope of the present invention. The combination fluid level indicator and discharge device may be coupled to any container. The present device is coupled to a compressor to illustrate the usefulness of the device and is not intended to be limiting.

The refrigerant to be compressed is preferably of the high pressure type which exists as both a liquid and a gas at room temperature within a pressurized container. Preferably, refrigerant such as R-12, R-22, R-500, R-502 and R-134A may be compressed by use of the present compressor 12. One skilled in the art would understand that a wide variety of refrigerants, too numerous to mention, may also be compressed in accordance with the present invention.

Referring now to FIG. 1, the compressor 12 has a housing 18 with an inlet 14 to receive vaporized refrigerant from a refrigeration unit. The compressor 12 also includes an outlet 16 from the housing 18 to expel refrigerant therefrom. Preferably, the compressor 12 is configured to produce a first or relatively lower pressure or partial vacuum at the inlet 14 for drawing refrigerant into the compressor 12. The compressor 12 transfers or moves refrigerant through the remainder of the refrigerant recovery unit by expelling refrigerant at the compressor outlet 16 at a second pressure above atmospheric pressure and above the pressure at the inlet 14 of the compressor 12.

Preferably, the compressor 12 is capable of recovering at least about ⅓ lb/min of vaporized refrigerant from a container, although one skilled in the art would understand that the transfer rate may vary based upon such variables as the type of compressor, other equipment selected and the type of refrigerant being transferred and the pressure of the refrigerant being compressed.

In the present embodiment, the compressor 12 is preferably a standard off-the-shelf item well understood by those skilled in the art. More particularly, the compressor is preferably available from Tecumseh Products Co., London, Ontario, Model No. AE4440A. Aspera, located in Calumet City, Ill., Model No. E6187B is a suggested alternative. The specific internal configurations and elements of the compressor 12 and motor therefor are within the knowledge of those of ordinary skill in the compressor art and, therefore, further description thereof is omitted for convenience only and is neither believed to be necessary nor limiting.

As best shown in FIG. 1, the housing 18 of compressor 12 includes a top 20, a bottom 22, and at least one side 24. The housing 18 is typically formed from a metal, such as cold rolled steel, although one of ordinary skill in the art would understand that the housing 18 may be formed from aluminum or any substantially rigid material which is impervious to and possesses sufficient strength to pressurize a refrigerant therein and contain a lubricating oil, indicated by broken line 40, or other fluid therein.

Figure 2:
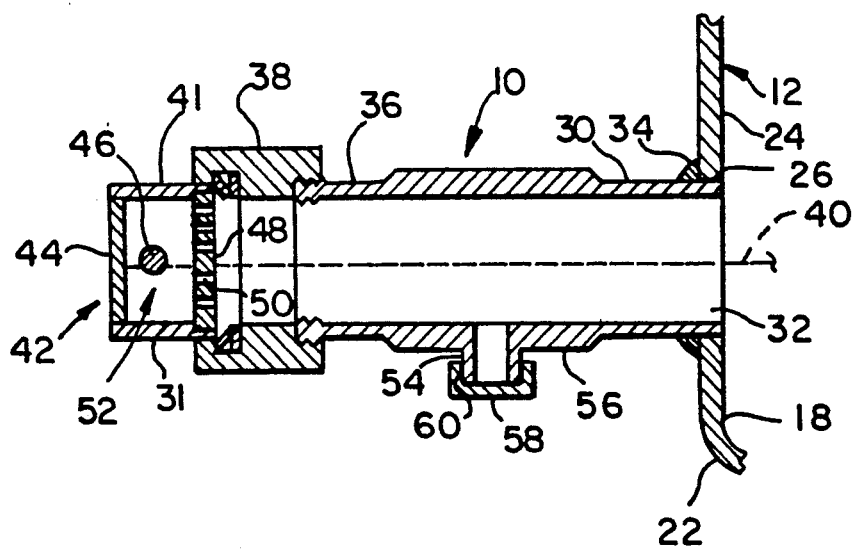
FIG. 2 is an enlarged cross-sectional view of the compressor and device taken along the lines 2—2 of FIG. 1.

As best shown in FIG. 2, the housing 18 includes an aperture 26 extending therethrough located proximate the bottom 22 of the housing 18. The aperture 26 may be generally circularly shaped, although one of ordinary skill in the art would understand that the aperture may be of any size and shape which is suitable to accommodate a portion of the combination lubricant level indicator and fluid discharge device 10.

The housing 18 is at least sufficiently sealed to contain the compressor lubricating oil or other lubricating fluid and refrigerant therein. The oil is denoted by a broken line 40 in the figures, also representing its upper level. Preferably, the housing is hermetically sealed in order to inhibit leakage of the vaporized refrigerant and compressor lubricating oil and to prevent corrosion from moisture.

A siphon (not shown) inside the compressor housing 18, which is part of the compressor mechanism, draws compressor lubricating oil from the bottom 22 of the housing 18 and spreads the compressor oil 40 over the top of the mechanism (not shown) which is located inside of the compressor top 20. This arrangement permits the vaporized refrigerant to freely circulate and mix with the compressor oil. The normal oil charge for the compressor 12, for example, is approximately 16 ounces. Up to about one-half ounce of the vaporized refrigerant may be trapped in the compressor oil after transfer is completed. Alternatively and/or additionally, a small amount of the compressor oil may dissipate into the refrigerant during operation. If the compressor oil 40 is not maintained at a sufficient level within the compressor 12, the compressor 12 could fail from lack of proper lubrication. Alternatively, if the compressor oil level is too high, a valve (not shown) in the line 16 through which compressed refrigerant is removed from the compressor 12 may be blocked.

It would be advantageous to have a means for monitoring the level of lubricating oil 40 within the compressor 12 which also permits selective discharge of the oil 40 from the compressor housing 18 such that the housing 18 may be substantially emptied of the oil 40.

The drawbacks and disadvantages of typical prior art lubricant level indicators and separate lubricant discharge ports are ameliorated or eliminated by the present combination lubricating fluid level indicator and fluid discharge device 10. As best shown in FIG. 2, the device 10 includes a tubular body in the form of a conduit 30 fluidly communicating with the compressor 12. Preferably, the conduit 30 has a generally cylindrical shape, best shown in FIGS. 2, 4 and 6, although the conduit may be generally rectangular rather than circular in cross-section, or may have any shape in cross section in keeping with the spirit and scope of the present invention.

The tubular body or conduit 30 may be formed from stainless steel or aluminum or any other material which is impervious to the lubricating oil and capable of resisting the temperatures and pressures typically encountered in the container or compressor 12. Preferably the conduit 30 is formed from the same material as the housing 18.

As best shown in FIG. 2, the conduit 30 open end fluidly communicates with the housing 18 through the aperture 26. The outer periphery of the conduit 30 at the inlet end 32 thereof is preferably secured to the aperture 26 of the housing by weldments or brazing 34, for example. However, some or all of the conduit 30 may be formed as an integral component of the housing 18 or attached by threading directly to the housing 18 or to a threaded retainer inside the housing 18 (none being shown). The device 10 and conduit 30 thus fluidly communicate with the housing 18 through the open inlet end 32. Preferably, the device 10 is hermetically sealed to the housing 18 in order to inhibit leakage of refrigerant and/or oil.

The conduit 30 extends from the aperture 26 in a direction generally perpendicular to the side 24 of the housing, as best shown in FIG. 2. Preferably, the length of the conduit 30 is minimized in order to minimize discrepancies between the level of the compressor oil 40 in the device 10 and throughout the housing 18. The conduit 30 receives lubricating oil or other compressor fluid, and possibly liquefied or vaporized refrigerant, from the compressor 12.

The device also includes an indicator means for indicating a level of the compressor oil 40 within the housing 18 or other fluid within a container coupled with the device 10. Preferably, the indicator means is a visual indicator, indicated generally at 42, at a distal end 31 of the conduit 30. However, one of ordinary skill in the art would understand that the indicator means may be located outside or remote to the conduit 30.

The conduit 30 may, for example, be formed from a single piece of tubing or from a plurality of segments of tubing having connectors therebetween to facilitate assembly and disassembly of the device 10. For example, as best shown in FIG. 2, the conduit 30 may include a threaded member 38 for permitting disassembly and removal of the visual indicator 42 from the remainder of the device 10. Preferably, the conduit 30 comprises at least one threaded tubular section 36 secured to the housing 18, a second threaded tubular section 41 of the visual indicator 42 and the threaded rotatable coupling member 38 releasably joining section 41 of the visual indicator 42 to the threaded tubular section 36. One of ordinary skill in the art would understand that the body may comprise more threaded tubular sections and couplings than shown to facilitate assembly and disassembly of the components of the device 10.

The indicator 42 provides a visual indication of a level of oil 40 within the compressor 12. Preferably, the indicator 42 is visible from the outside of the conduit 30 and the housing 18 and is responsive to a level of the oil 40 within the housing 18.

It is preferred that the indicator 42 includes a sight glass 44 mounted in the conduit 30. Preferably, the sight glass 44 is mounted generally perpendicularly to a longitudinal axis of the conduit 30 and is generally parallel to the side 24 of the housing 18. The sight glass 44 is preferably provided by a single glass member, also indicated by reference numeral 44, which is positioned in second threaded tubular section 41 at the end 31 of the conduit 30 which is distal to the housing 18. The glass member 44 may be positioned within the distal end 31 of the conduit 30 by melt bonding the glass to the tubular section 41 or by other connecting means which enables the device 10 to be capable of withstanding a hydrostatic test in which the interior of the device 10 is pressurized to 675 psi for one minute. One of ordinary skill in the art would understand that the sight glass 44 may be positioned at the distal end 31 of the conduit 30 by a variety of means so long as the device 10 is capable of maintaining structural integrity at typical operating temperatures and pressures. Likewise, one of ordinary skill in the art would be able to determine the thickness and suitable materials for forming the sight glass and further discussion thereof is not believed to be necessary nor limiting.

The visual indicator 42 further comprises a float member 46 and a screen 48 positioned to prevent the float member 46 from entering a fluid port 54, which constitutes part of a fluid discharge means of the device 10. Preferably, the float member 46 is constructed of a material having a density less than that of the compressor oil in order to enable the float member 46 to float upon and thereby indicate the level of the compressor oil 40 in the conduit 30 and compressor 12.

Preferably, the screen 48 is formed from a metallic material, such as stainless steel or aluminum, although one of ordinary skill in the art would understand that the screen 48 may be formed from any material which resists degradation by contact with the lubricating fluid, such as compressor oil and/or the refrigerant. The screen 48 includes at least one, and preferably a plurality of apertures 50 extending therethrough which permit the compressor oil 40 to flow from the housing 18 through the conduit 30 to the sight glass 44, to thereby provide an accurate indication of the level 40 of the compressor oil within the conduit 30 and the compressor 12.

The sight glass 44, screen 48 and the second tubular section 41 defining the distal end 31 of the conduit 30 define a chamber, indicated generally at 52, for retaining the float member 46 proximal the sight glass 44. The chamber 52 prevents the float member 46 from exiting the conduit 30 when compressor oil is drained through the discharge port 54.

The discharge port 54 of device 10 constitutes part of a means for permitting selective discharge of the lubricating oil from the housing 18 through at least part of the conduit 30. Preferably, the discharge means is provided by fluid discharge port 54, which is fluidly coupled with the conduit 30. The discharge port 54 is located on a lower side 56 of the conduit 30. As best shown in FIG. 2, the portion of the conduit 30 in which the discharge port 54 is located may be of greater cross-sectional thickness than the remainder of the conduit 30 in order to enhance the structural integrity of the conduit 30. Alternatively, the discharge port 54 may be mounted-upon/through an aperture in the lower side 56 of the conduit 30 and connected thereto by typical connector means such as welding, brazing or threading. Preferably, the discharge port 54 is formed integrally, in a single piece with the remainder conduit section 36 and of the same material as the conduit section 36, although one of ordinary skill in the art would understand that the discharge port 54 may be formed from a material different than that of the conduit 30.

As best shown in FIG. 2, an openable port closure member in the form of a removable cap 58 may be threadably or otherwise movably coupled with an end 60 of the discharge port 54 distal to the conduit 30 to permit selective opening of the port 54 to drain oil from the housing 18, which is fluidly coupled with port 54 through the open inlet end 26 of the conduit 30 and the portion of the conduit 30 between that end 26 and the port 54.

Figure 3:
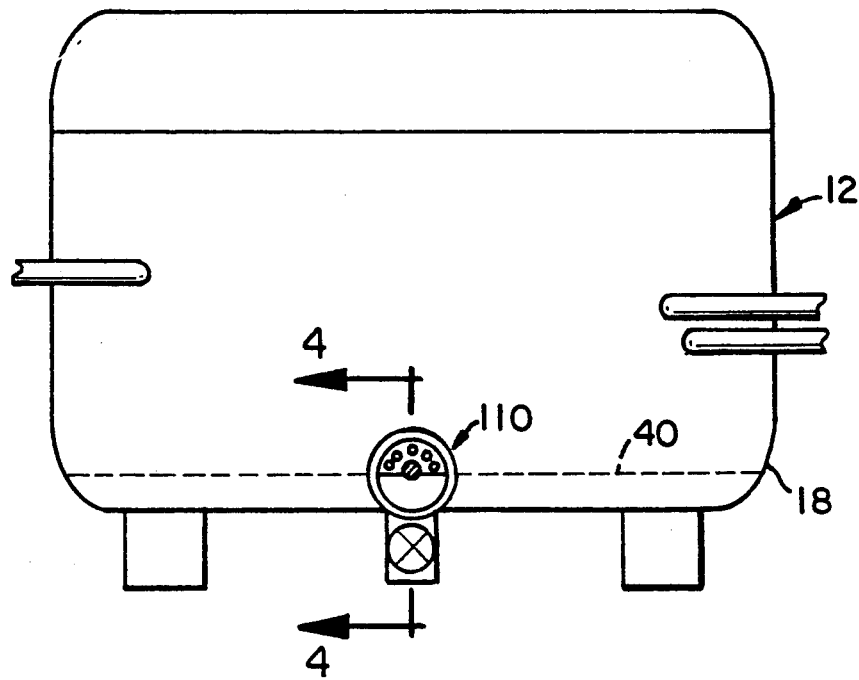
FIG. 3 is a front elevational view of an alternative embodiment of a compressor and combination lubricating fluid level indicator and fluid discharge device, according to the present invention.
Figure 4:
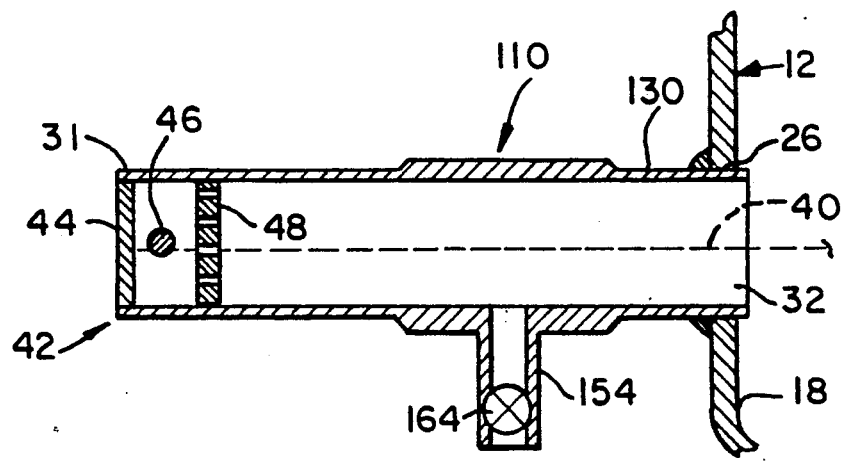
FIG. 4 is an enlarged cross-sectional view of the compressor and device taken along the lines 4—4 of FIG. 3.

In one alternative preferred embodiment, namely combined fluid level indicator and discharge device indicated at 110 in FIGS. 3 and 4, and best shown in FIG. 4, the tubular body 130 may be one integral conduit and a valve 164 may be installed in, mounted to or otherwise fluidly coupled with the discharge port 154 for sealing of and selective discharge of oil from compressor housing 18. Sight glass 44 and screen 48 are mounted within conduit 130 itself. It is understood by those of ordinary skill in the art that a ball valve, stop cock or any other suitable type of valve could be used as the valve 164.

Figure 5:
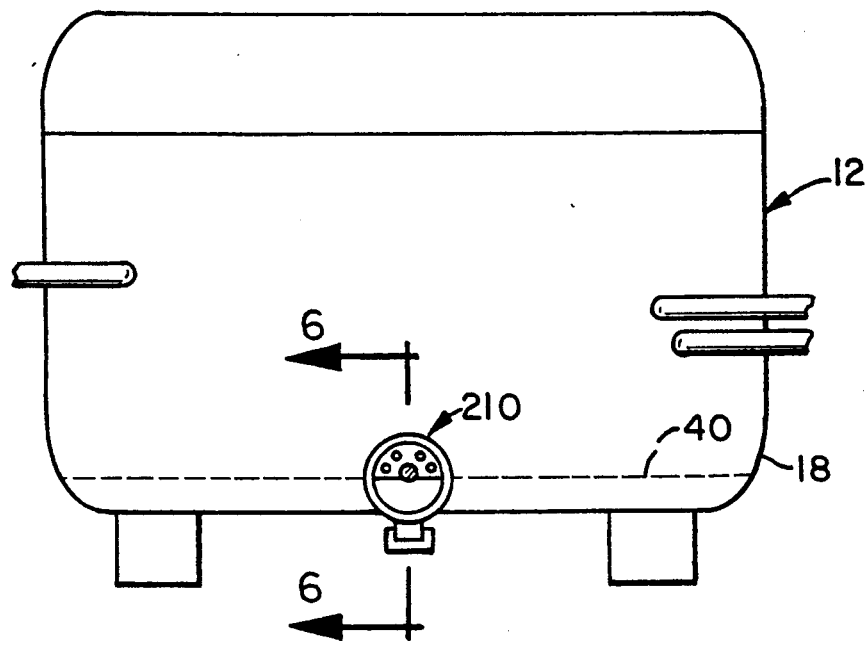
FIG. 5 is a front elevational view of another alternative embodiment of a compressor and combination lubricating fluid level indicator and fluid discharge device, according to the present invention.
Figure 6:
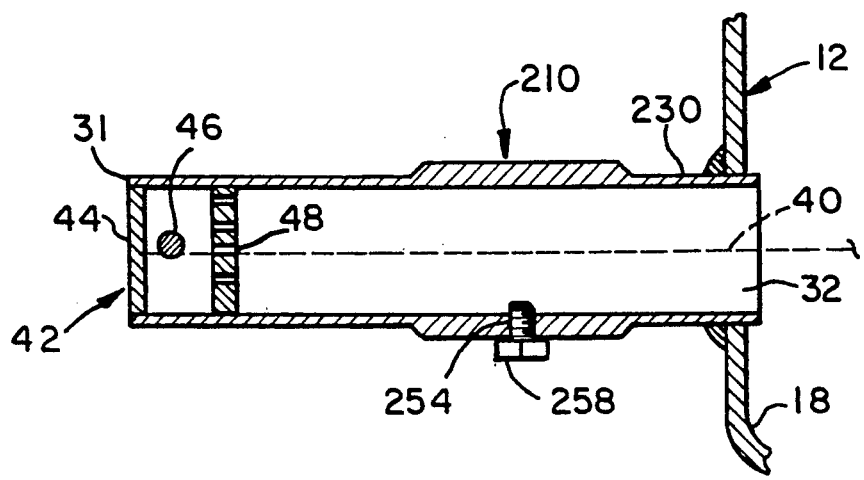
FIG. 6 is an enlarged cross-sectional view of the compressor and device taken along the lines 6—6 of FIG. 5.

Another alternative embodiment combined fluid level indicator and discharge device is indicated at 210 in FIGS. 5 and 6. As best shown in FIG. 6, a conduit 230 is provided with a discharge port 254 in the form of an internally threaded bore which receives a threaded plug 258, which may be in the form of a bolt. A washer (not depicted) can further be provided, if desired, to assure sealing. Any other suitable, openable port closure member may be movably coupled with any appropriately configured port to permit selective discharge of the oil from said inlet end 26 through part of the conduit 30, 130 or 230 and port 54, 154 or 254. Also the multi-piece conduit 30 of FIGS. 1 and 2 can be substituted for either one-piece conduit 130 or 230. Sparlan Valve Co. of St. Louis, Mo. will bond glass 44 in a metal tube.

Oil 40 may be drained from the housing 18 by simply removing the cap 58 or plug 258 or opening the valve 164, which is connected to the discharge port 54, 254 and 154, respectively, of the devices 10, 210 and 110. Also, the level indicating feature is helpful in filling or refilling the housing 18 with oil or other liquid.

Any of the devices 10, 110 or 210 may be readily connected to a variety of containers to provide an easy method for determining the level of lubricating fluid in a container and to facilitate removal of the fluid therefrom.

It will be appreciated by those skilled in the art that other changes could be made to the embodiment described above without departing from the broad inventive concept thereof. It should be understood, therefore, that this invention is not limited to the particular embodiment disclosed, but it is intended to cover all modifications which are within the spirit and scope of the invention, as defined by the appended claims.

We claim:

1. A combination fluid level indicator and fluid discharge device for use with a container containing a fluid therein, said device comprising a tubular body having an open inlet end permitting communication with said fluid when said open end is fluidly coupled with said container, discharge means for permitting selective discharge of said fluid from said open inlet end through at least part of said tubular body, and an indicator providing an indication of a level of said fluid within said container when said open end is fluidly coupled with said container, said indicator being viewable outside of said body, said indicator including a float member and a fluid porous barrier positioned to prevent said float member from being discharged through said discharge means.

2. A combination fluid level indicator and fluid discharge device for use with a container containing a fluid therein, said device comprising a tubular body having an open inlet end, a discharge port fluidly coupled with said open inlet end through at least part of said tubular body, an openable port closure member movably coupled with said port to permit selective discharge of said fluid from said open inlet end through at least part of said body and through said port, and a fluid level indicator configured and located to provide a visual indication from outside said body of a level of fluid within said body, said indicator including a float member and a fluid porous barrier positioned to prevent said float member from being discharged from said discharge port.

3. A compressor for receiving a gas at a first pressure and expelling said gas at a second pressure higher than said first pressure, said compressor comprising:
a housing having a top, a bottom, and at least one side including an aperture extending therethrough located proximate said bottom, said housing being at least sufficiently sealed to contain a compressor lubricating fluid therein; and
a combination lubricating fluid level indicator and fluid discharge device, said device including a tubular body fluidly communicating with said housing through said aperture, a discharge means for permitting selective discharge of said lubricating fluid from said housing through at least part of said body and an indicator means for indicating a level of said lubricating fluid within said fluidly coupled housing, said indicator means including a float member and a screen positioned to prevent said float member from being discharged through said discharge means.

4. A compressor according to claim 3, wherein said body comprises a conduit extending from said aperture in a direction generally perpendicular to said side of said housing.

5. A compressor according to claim 3, wherein said discharge means comprises a discharge port of a lower portion of said body.

6. A compressor according to claim 5, wherein said discharge means further comprises a valve coupled with said discharge port.

7. A compressor according to claim 3, wherein said indicator means includes a sight glass mounted in said body.

8. A compressor according to claim 7, wherein said sight glass is positioned in an end of said body distal to said housing.

9. A compressor according to claim 7, wherein said body includes a threaded member for permitting disassembly and removal of said indicator means from said device.

10. A compressor for receiving a gas at a first pressure and expelling said gas at a second pressure higher than said first pressure, said compressor comprising:
a housing having a top, a bottom, and at least one side including an aperture extending therethrough located proximate said bottom, said housing being at least sufficiently sealed to contain a compressor lubricating fluid therein; and
a combination lubricating fluid level indicator and fluid discharge device including a tubular body having an open inlet end in fluid communication with said housing through said aperture, a fluid discharge port fluidly coupled with said housing through at least part of said body to discharge said lubricating fluid from said housing through at least said part of said body and said port, and a visual indicator within the body and responsive to a level of said lubricating fluid within said housing, said indicator being visible from outside said body and said housing, said indicator including a float member and a screen positioned to prevent said float member from being discharged through said discharge port.

11. A compressor according to claim 10, wherein said body comprises a conduit extending from said aperture in a direction generally perpendicular to said side of said housing.

12. A compressor according to claim 10, further comprising a valve in said discharge port.

13. A compressor according to claim 10, further comprising a seal member threadingly coupled with said discharge port.

14. A compressor according to claim 10, wherein said visual indicator includes a sight glass mounted to said body.

15. A compressor according to claim 14, wherein said sight glass is positioned in an end of said body distal to said housing.

16. A compressor according to claim 10, wherein said body comprises at least one threaded tubular section and at least one threaded rotatable coupling member releasably joining the threaded tubular section to the indicator.

17. A compressor according to claim 10, wherein said housing is hermetically sealed and wherein said device is hermetically sealed with said housing.

18. A compressor according to claim 17, further comprising a quantity of lubricating oil in the bottom of said housing having a level indicated by said indicator.

19. A combination fluid level indicator and fluid discharge device for use with a container containing a fluid therein, said device comprising a tubular body having an open inlet end permitting fluid coupling of said body with said container, a discharge port and an openable closure member associated with the port to permit selective discharge of said fluid from said open inlet end through at least part of said tubular body and said port, a float member positioned in said body, and a sight glass mounted in said body so as to simultaneously expose said float member and any fluid supporting said float member to view from outside of said body.

20. A compressor for receiving a gas at a first pressure and expelling said gas at a second pressure higher than said first pressure, said compressor comprising:
a housing having a top, a bottom, and at least one side including an aperture extending therethrough located proximate said bottom, said housing being at least sufficiently sealed to contain a compressor lubricating fluid therein; and
a combination lubricating fluid level indicator and fluid discharge device, said device including a tubular body fluidly communicating with said housing through said aperture, a discharge port and an openable port closure member associated with the port to permit selective discharge of said lubricating fluid from said housing through at least part of said body and said port, a float member positioned in said body, and a sight glass mounted in said body so as to simultaneously expose said float member and any fluid supporting said float member to view from outside of said body.

* * * * *